(12) United States Patent
Chang

(10) Patent No.: US 7,128,287 B1
(45) Date of Patent: Oct. 31, 2006

(54) FISHING REEL

(75) Inventor: Liang-Jen Chang, Taichung County (TW)

(73) Assignee: Okuma Fishing Tackle Co. Ltd., Taichung County (TW)

( * ) Notice: Subject to any disclaimer, the term of this patent is extended or adjusted under 35 U.S.C. 154(b) by 0 days.

(21) Appl. No.: 11/270,484

(22) Filed: Nov. 10, 2005

(51) Int. Cl.
*A01K 89/01* (2006.01)
(52) U.S. Cl. ...................... 242/300; 242/297
(58) Field of Classification Search ......... 242/296–301
See application file for complete search history.

(56) References Cited

U.S. PATENT DOCUMENTS

| | | | | |
|---|---|---|---|---|
| 4,540,134 A | * | 9/1985 | Schankler | 242/587.3 |
| 4,650,134 A | * | 3/1987 | Councilman | 242/248 |
| 4,919,361 A | * | 4/1990 | Kobayashi | 242/300 |
| 5,458,297 A | * | 10/1995 | Shinohara et al. | 242/247 |
| 5,489,069 A | * | 2/1996 | Shinohara et al. | 242/247 |
| 5,505,396 A | * | 4/1996 | Chesterfield et al. | 242/298 |
| 6,517,021 B1 | * | 2/2003 | Ikuta | 242/247 |
| 6,634,486 B1 | * | 10/2003 | Bennett | 198/631.1 |

* cited by examiner

*Primary Examiner*—Emmanuel M Marcelo
(74) *Attorney, Agent, or Firm*—Browdy and Neimark, PLLC

(57) ABSTRACT

A fishing reel includes a housing, a handle mounted on the housing by an axle, a spool rotatably mounted on the housing, a transmission gear having multiple ratchets mounted at one end of the spool, a power transmitting device for transmitting power from the axle to the transmission gear, two pawls pivotally mounted on the housing and a connecting rod. The connecting rod having a clamping portion for clamping the axle, and two insertion portions being inserted into the elongated slot of the pawls. The fishing reel of the present invention is silent when the spool rotates and is operated smoothly with tiny friction.

6 Claims, 8 Drawing Sheets

US 7,128,287 B1

FISHING REEL

BACKGROUND OF THE INVENTION

1. Field of the Invention

The present invention relates to a fishing tool and more particularly to a fishing reel that is silent during operation. The fishing reel is operated smoothly with tiny friction.

2. Description of the Related Art

A conventional fishing reel 1, as shown in FIG. 1, comprises a housing 2, a handle 3 mounted on a side of the housing 2 by an axle 4, and a spool 5 mounted on the housing 2 and being driven to rotate by the handle 3. The structure of the fishing reel 1 is shown in FIGS. 2 and 3. A gear 6 is sleeved onto the axle 4. The gear 6 engages with a toothed portion 8 of an axial rod 7. The axial rod 7 is inserted into an insertion hole 91 of a transmission gear 9. When a user rotates the handle 3 clockwise (in the direction as shown in FIG. 1), the spool 5 is driven to rotate counterclockwise by the axle 4, the axial rod 7 and the transmission gear 9 to roll up the fishing line.

To prevent the fishing line wound around the spool 5 from being pulled out unintentionally (that is, the spool 5 is driven to rotate clockwise), a clamping ring 93 is clamped onto the transmission gear 9 and two pawls 95 are pivotally mounted in the inner wall of the housing 2. The clamping ring 93 has two pins 94. Each of the two pawls 95 has a slot 96 for receiving the pin 94 of the clamping ring 93. When the transmission gear 9 is rotated in the direction as indicated by the arrow of FIG. 4, the clamping ring 93 is rotated with the transmission gear 9 due to friction. At this time, the pins 94 of the clamping ring 93 are driving the two pawls 95 to disengage with the ratchet 97 of the transmission gear 9. The spool 5 is driven by the transmission gear 9 to rotate counterclockwise. On the contrary, when the transmission gear 9 is rotated in the direction as indicated by the arrow of FIG. 5, the pins 94 of the clamping ring 93 are driving the two pawls 95 to engage with the ratchet 97 of the transmission gear 9. The spool 5 cannot rotate further in this situation. The two pawls 95 are prevent from hitting the transmission gear 9 during the situation as indicated in FIG. 4. Therefore the fishing reel 1 almost keeps silent during normal operation.

When the clamping ring 93 is rotated with the transmission gear 9 to the state shown in FIG. 4 or 5, the clamping ring 93 is not rotated with the transmission gear 9 any more. The friction between the clamping ring 93 and the transmission gear 9 becomes resistance during operation of the fishing reel 1. Sometimes the friction significantly affects smooth operation of the fishing reel 1. The industry is eager to solve above problem nowadays.

SUMMARY OF THE INVENTION

The primary objective of the present invention is to provide a soundless fishing reel, which is operated smoothly with tiny friction.

According to the objective of the present invention, a fishing reel comprises a housing, a handle, a spool, a transmission gear, means for transmitting power from a axle to the transmission gear, at least one pawl and a connecting rod. The handle is mounted on the housing via an axle. The spool is rotatably mounted on the housing. The transmission gear is mounted at one end of the spool. The transmission gear has a periphery with multiple ratchets. The pawl is pivotally mounted on the housing and pivotable between a first position and a second position. The pawl has an elongated slot. The connecting rod has a clamping portion for clamping the axle, and at least one insertion portion extending from the clamping portion and being inserted into the elongated slot of the pawl. The pawl is disengaged with the transmission gear when the pawl is at the first position, and the pawl is engaged with the ratchets of the transmission gear to make the transmission gear unable to rotate when the pawl is at the second position.

DETAILED DESCRIPTION OF THE INVENTION

Figure 6:
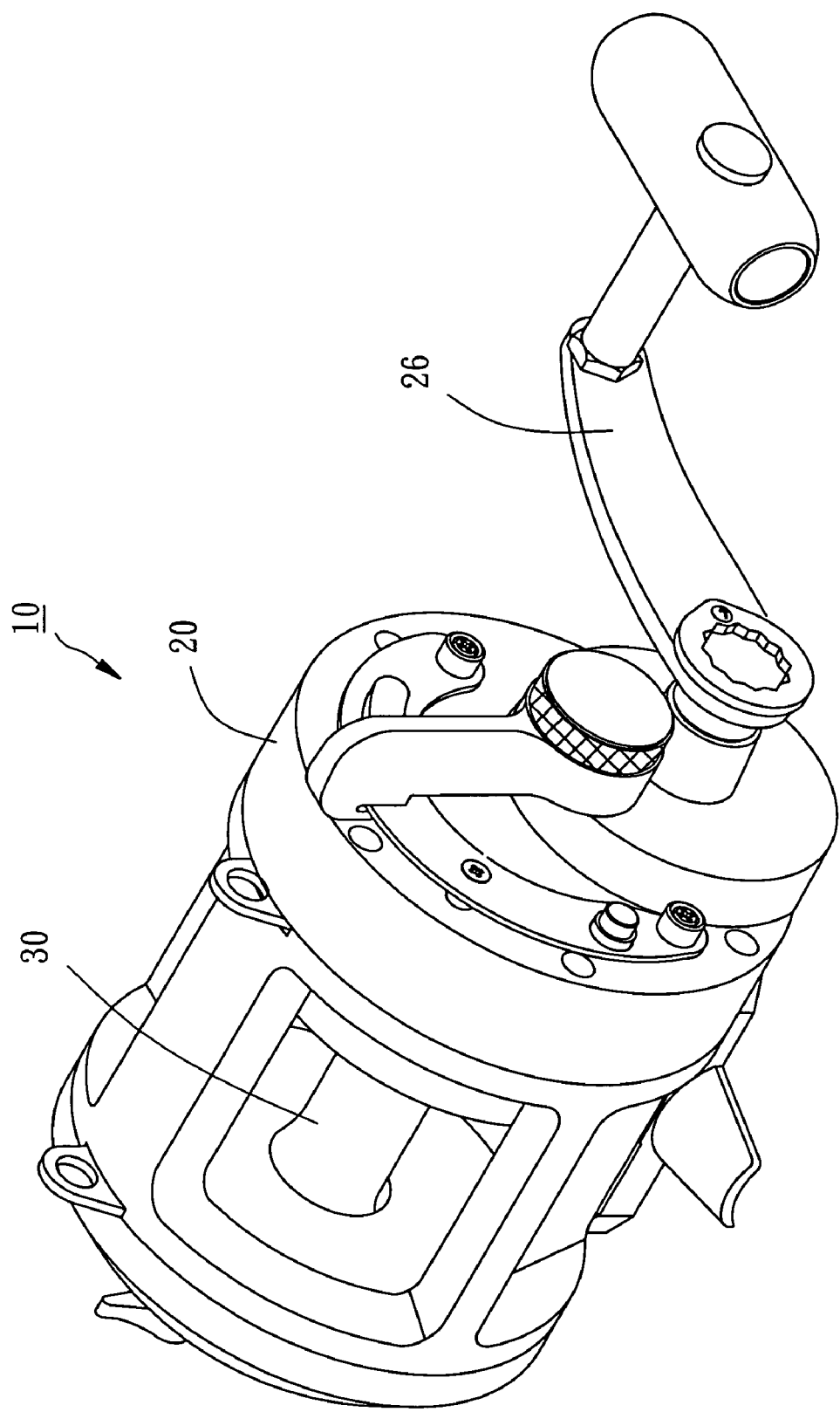
FIG. 6 is a perspective view of a preferred embodiment of the present invention.
Figure 7:
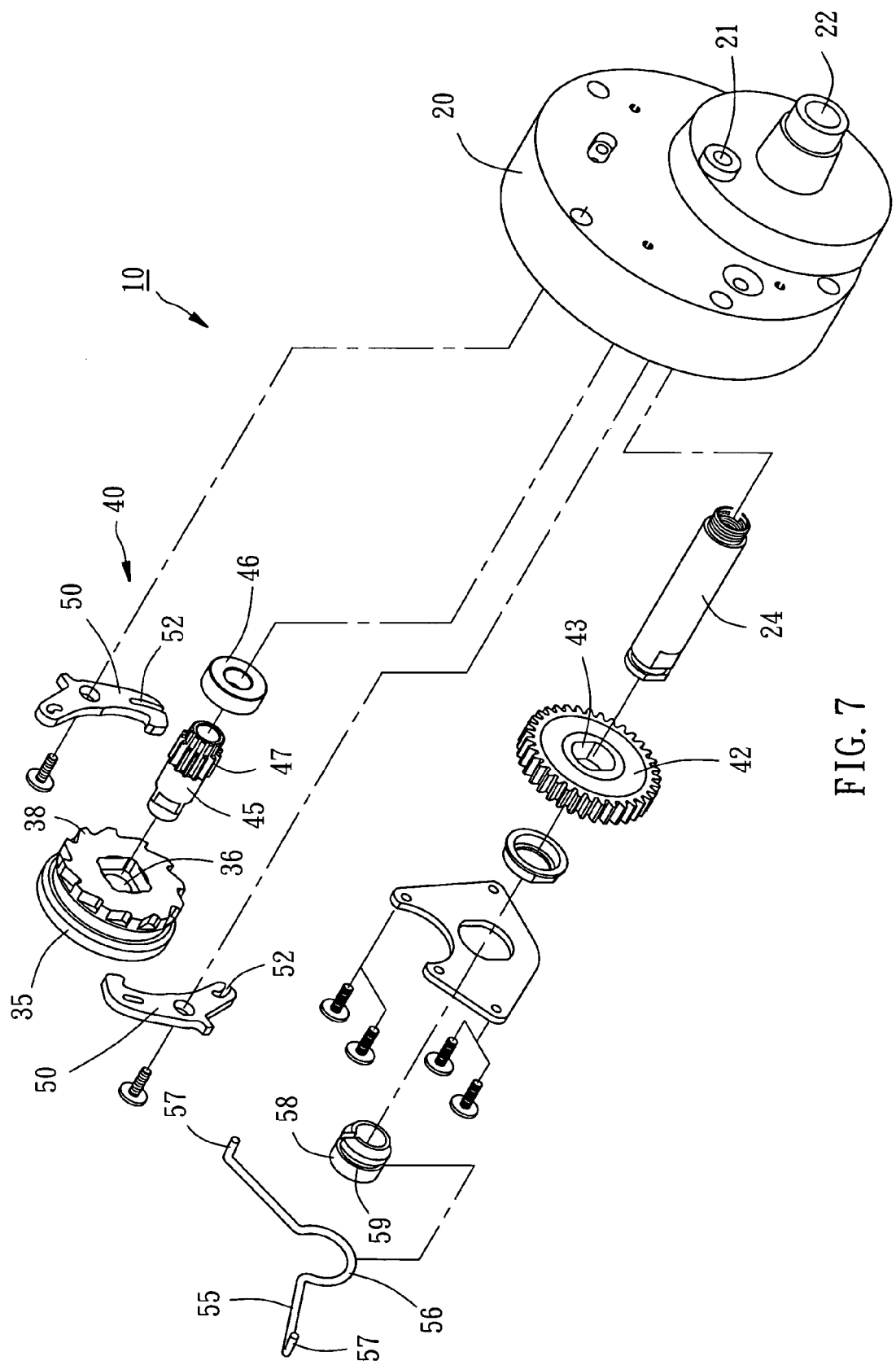
FIG. 7 is an exploded perspective view in parts of a preferred embodiment of the present invention.
Figure 8:
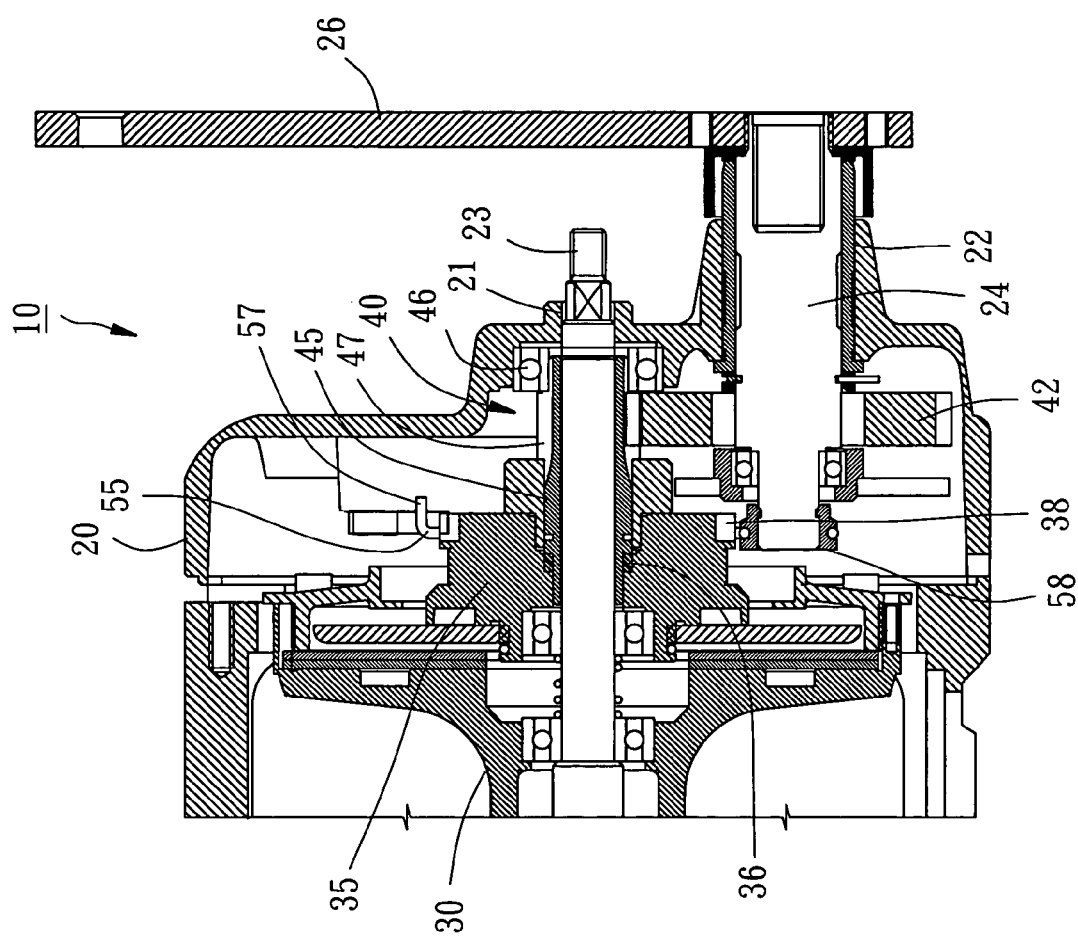
FIG. 8 is a sectional view in parts of a preferred embodiment of the present invention.

Referring to FIGS. 6–8, a fishing reel 10 in accordance with the preferred embodiment of the present invention is shown comprising a housing 20, a handle 26, a spool 30, a transmission gear 35, power-transmitting means 40, two pawls 50 and a connecting rod 55.

The housing 20 has an axial hole 21 and a side hole 22 for receiving a shaft 23 and an axle 24 respectively. The handle 26 is mounted on the housing 20 via the axle 24. The spool 30 is mounted on the housing 20 via the shaft 23. The transmission gear 35 is mounted on the right end of the spool 30. The spool 30 is driven to rotate by the transmission gear 35. The transmission gear 35 has an insertion hole 36 for receiving the shaft 23. The insertion hole 36 is non-circular. The transmission gear 35 is driven to rotate by the shaft 23. The transmission gear 35 has a periphery with multiple ratchets 38.

The means 40 for transmitting power from the axle 24 to the transmission gear 35 has multiple variations. In the preferred embodiment of the present invention, the means 40 for transmitting power from the axle 24 to the transmission gear 35 comprise a gear 42 and an axial rod 45. The gear 42 has a non-circular insertion hole 43 for receiving the axle 24. That is, the gear is sleeved onto the axle. The contact section of the axle 24 with the gear 42 has a cross sectional shape corresponding with that of the insertion hole 43 of the gear 42. Therefore the axle 24 can drives the gear 42 to rotate. The axial rod 45 is sleeved onto the shaft 23. The left end of the axial rod 45 is inserted into the insertion hole 36 of the transmission gear 35. The left end of the axial rod 45 has a cross sectional shape corresponding to that of the insertion hole 36 of the transmission gear 35. Therefore the axial rod 45 can drives the transmission gear 35 to rotate. The right end of the axial rod 45 is rotatably mounted on the housing 20 via a bearing 46. The axial rod 45 has a toothed portion 47 engaging with the gear 42. The axial rod 45 is driven to rotate by the gear 42. When a user rotates the handle 26, the driving power is transmitted by the axle 24, the gear 42, the axial rod 45 and the transmission gear 35 to the spool 30 to rotate the spool 30.

Figure 9:
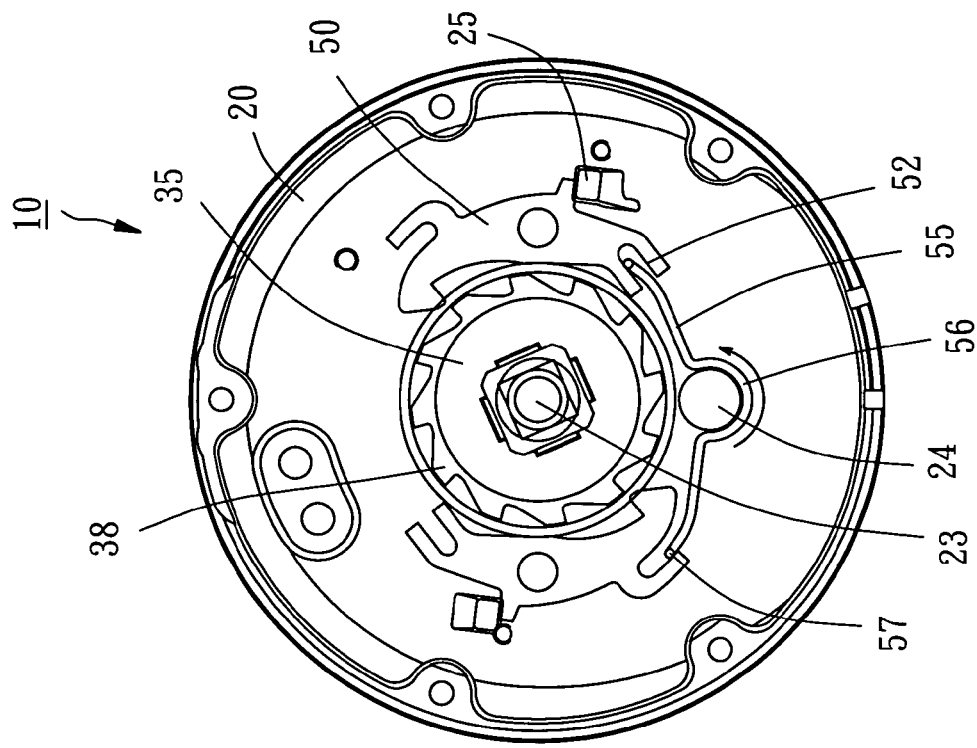
FIG. 9 is an operational view of a preferred embodiment of the present invention.
Figure 10:
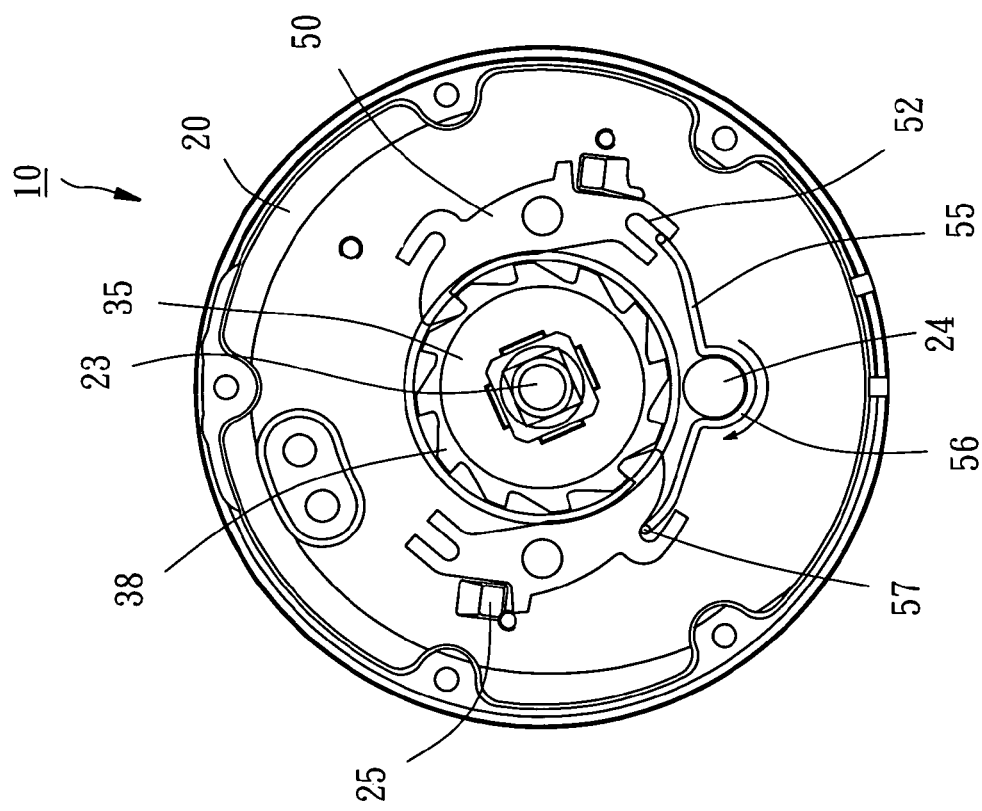
FIG. 10 is another operational view of a preferred embodiment of the present invention.

Each of the two pawls 50 is pivotally mounted on the housing 20 and pivotable between a first position as shown in FIG. 9 and a second position as shown in FIG. 10. An elongated slot 52 is provided at one end of each of the two pawls 50. The elongated slot 52 is an open elongated slot. In practice, the elongated slot 52 may be made as a closed elongated slot.

The connecting rod 55 has a clamping portion 56 for clamping the axle 24, and two insertion portions 57 extending from the clamping portion. Each of the two insertion portion is inserted into the elongated slot 52 of each of the two pawls 50 respectively. For reducing the friction between the connecting rod 55 and the axle 24, a bushing 58 made of plastic is sleeved onto the axle 24 in the preferred embodiment of the present invention. The bushing 58 has an annular groove 59 for receiving the clamping portion 56 of the connecting rod 55. If necessary, the bushing 58 is not provided, and the connecting rod 55 is directly mounted on the axle 24.

When a user rotates the handle 26 clockwise (in the direction as shown in FIG. 6), as shown in FIG. 9, the axle 24 is rotated in the direction indicated by the arrow. The connecting rod 55 is driven by the friction to rotate in the same direction. The two insertion portions 57 of the connecting rod 55 drive the two pawls 50 to rotate to the first position. At this time, the two pawls 50 are disengaged with the transmission gear 35. The driving power from the handle 26 is transmitted to the spool 30 to rotate the spool 30. The inner wall of the housing 20 is provided with two posts 25 to restrain the rotation angle of the two pawls 50. The two pawls 50 are against to the two posts 25 when the two pawls 50 are at the first position. On the contrary, when a user rotates the handle 26 counterclockwise, as shown in FIG. 10, the axle 24 is rotated in the direction indicated by the arrow. The connecting rod 55 is driven by the friction to rotate in the same direction. The two insertion portions 57 of the connecting rod 55 drive the two pawls 50 to rotate to the second position. At this time, the two pawls 50 engage with the ratchets 38 of the transmission gear 35 to make the transmission gear 35 unable to rotate. The power from the handle 26 cannot be transmitted to the spool 30. When the two pawls 50 are at the first position, the transmission gear 35 doesn't touch the two pawls 50. There is no sound generated during the transmission gear 35 rotate. In alternative, the position of the two pawls 50 can be changed.

Figure 1:
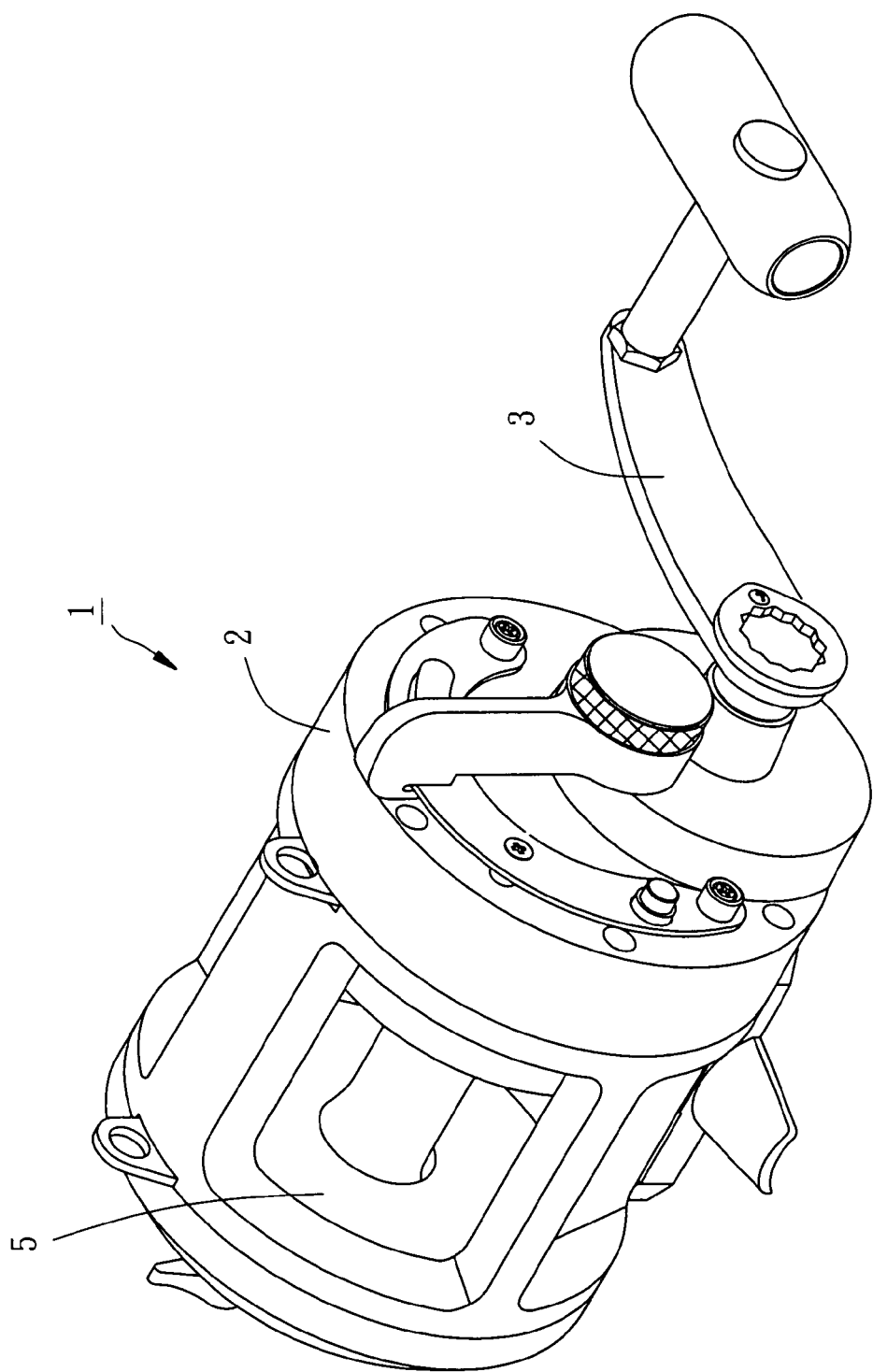
FIG. 1 is a perspective view of a conventional fishing reel.
Figure 2:
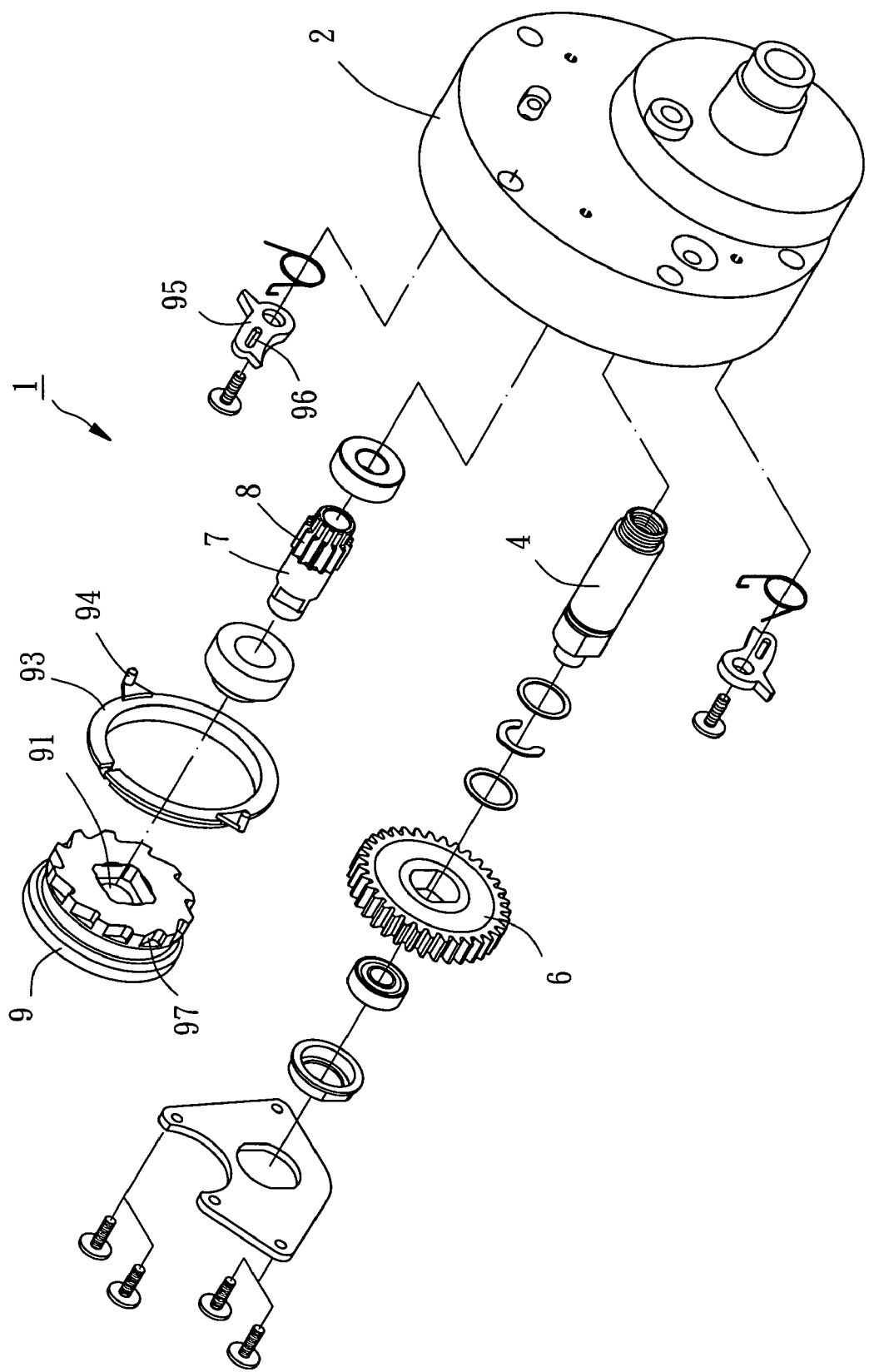
FIG. 2 is an exploded perspective view in parts of the conventional fishing reel.
Figure 3:
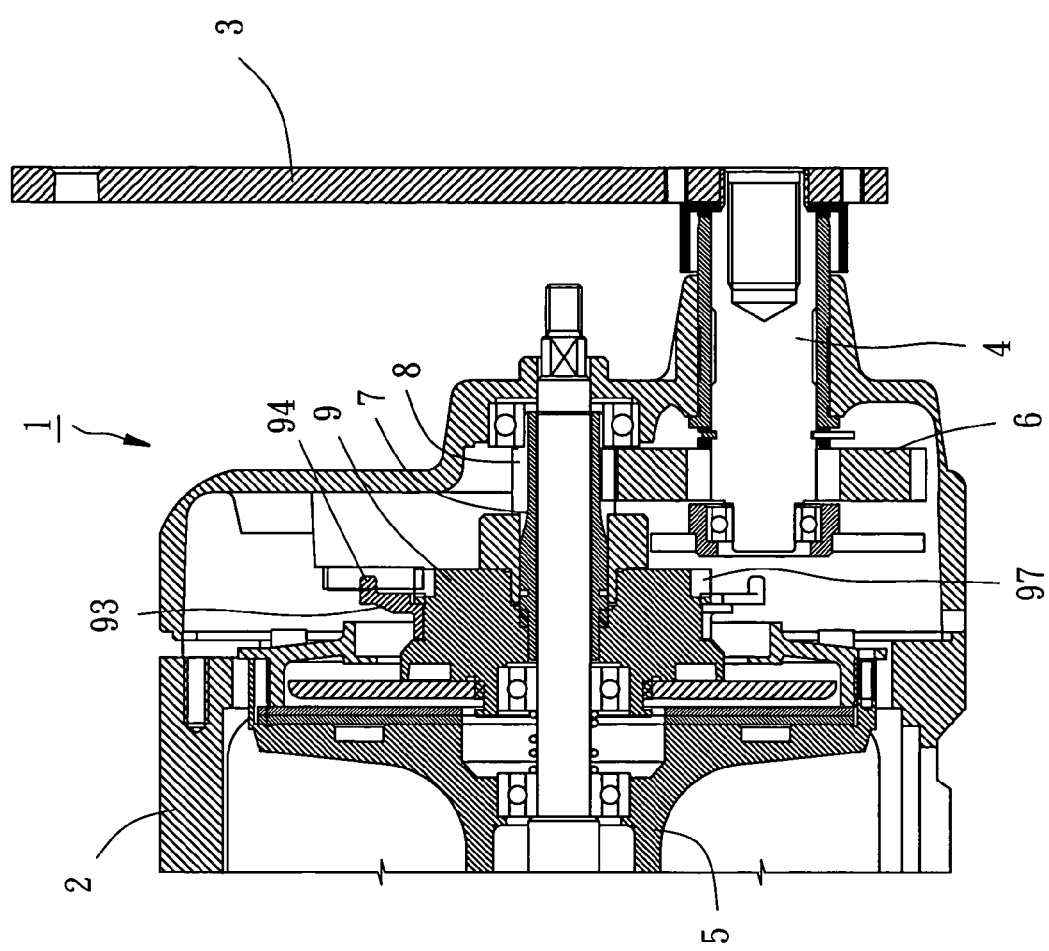
FIG. 3 is a sectional view in parts of the conventional fishing reel.
Figure 4:
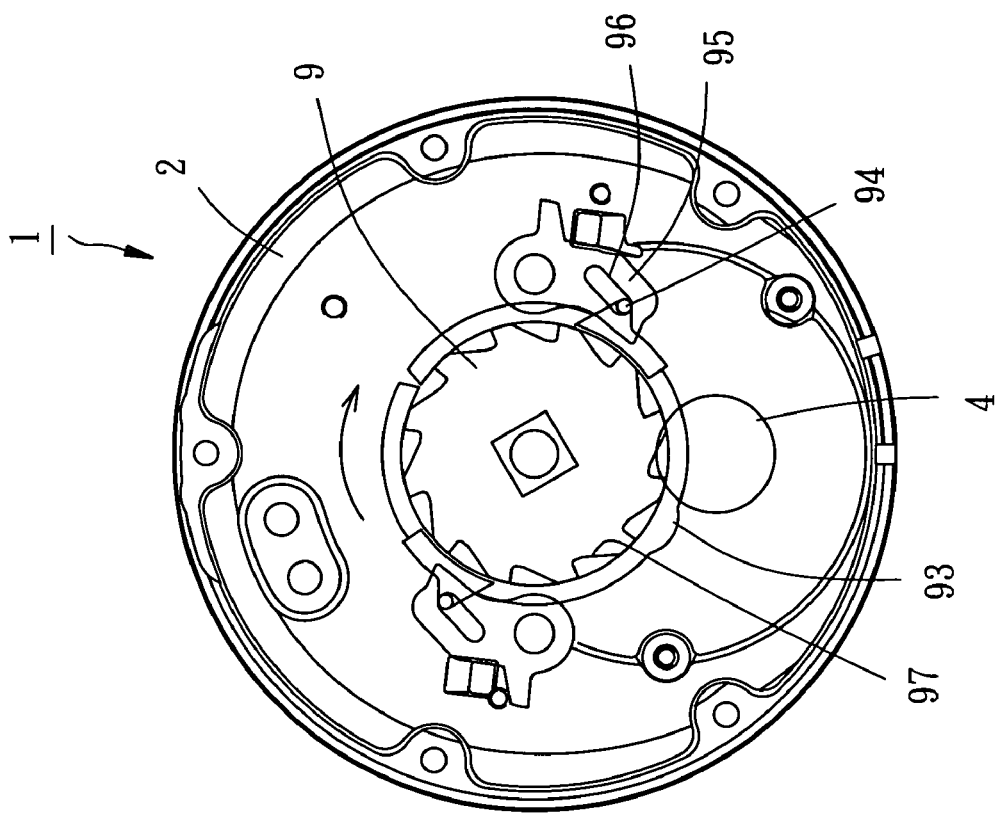
FIG. 4 is an operational view of the conventional fishing reel.
Figure 5:
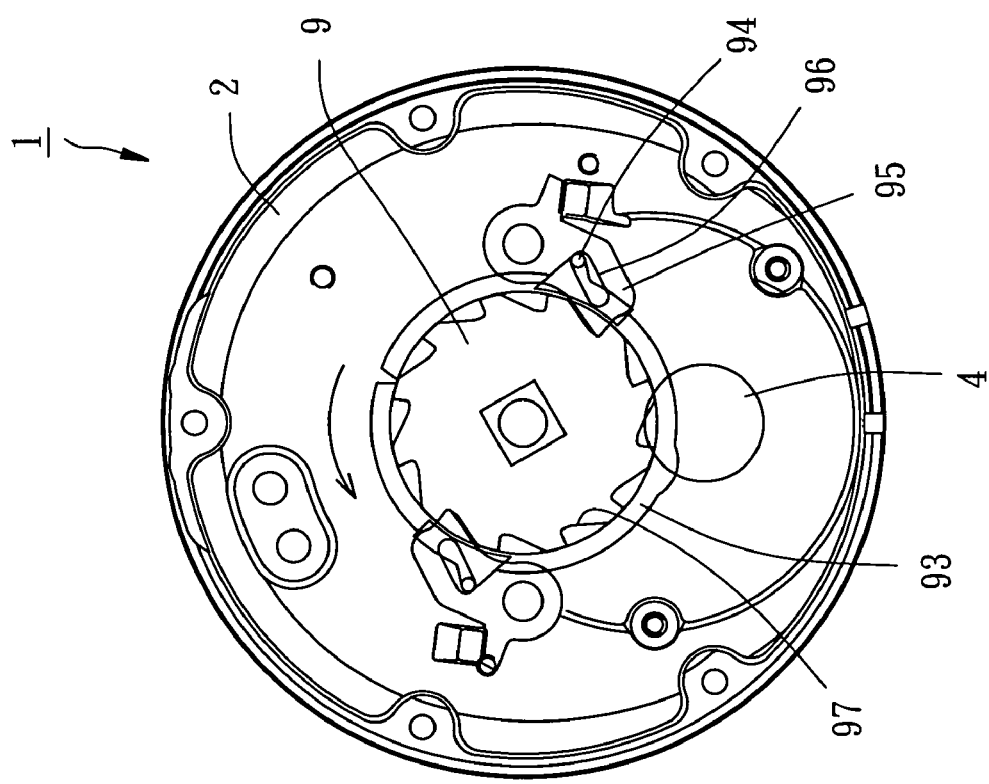
FIG. 5 is another operational view of the conventional fishing reel.

When the connecting rod 55 is rotated with the axle 24 (or the bushing 58) to the state as shown in FIG. 9 or 10, the connecting rod 55 is not rotated with the axle 24 (or the bushing 58) any more. The friction between the connecting rod 55 and the axle 24 (or the bushing 58) forms resistance during operation of the fishing reel 10. However, the experiment proves that the friction between the connecting rod 55 and the axle 24 (or the bushing 58) in the preferred embodiment of the present invention is much smaller than that between the clamping ring 93 and the transmission gear 9 of the conventional fishing reel, as shown in FIG. 2. Therefore the fishing reel 10 of the present invention is operated smoothly. In addition, the contact area between the connecting rod 55 and the bushing 58 in the preferred embodiment of the present invention is smaller than that between the mounting ring 93 and the transmission gear 9 of the conventional fishing reel. Therefore the heat generated by friction during operation of the fishing reel 10 in the preferred embodiment of the present invention is dissipated easily. It prevents the member of the fishing reel 10 from being deformed or worn by the heat during high-speed operation of the fishing reel 10. Besides, the connecting rod 55 in the preferred embodiment of the present invention is easier and cheaper to manufacture than the mounting ring 93 of the conventional fishing reel.

According to the spirit of the present invention, the structure of the fishing reel has multiple alternative designs. The handle can be changed from the right-handed position to the left-handed position. The purpose of power-transmitting means is to transmit power from the axle to the transmission gear. The structure of the power-transmitting means can be substituted according to user's requirement. The fishing reel may have a single pawl and the connecting rod may has only an insertion portion correspondingly.

What is claimed is:

1. A fishing reel comprising:
   a housing;
   a handle mounted on the housing via an axle;
   a spool rotatably mounted on the housing;
   a transmission gear mounted at one end of the spool, the transmission gear having a periphery with multiple ratchets;
   means for transmitting power from the axle to the transmission gear;
   at least one pawl pivotally mounted on the housing and pivotable between a first position and a second position, the pawl having an elongated slot; and
   a connecting rod having a clamping portion for clamping the axle, and at least one insertion portion extending from the clamping portion and being inserted into the elongated slot of the pawl;
   wherein the pawl is disengaged with the transmission gear when the pawl is at the first position, and the pawl is engaged with the ratchets of the transmission gear to make the transmission gear unable to rotate when the pawl is at the second position.

2. The fishing reel as claimed in claim 1, further comprising a bushing sleeving onto the axle for mounting of the clamping portion of the connecting rod thereon.

3. The fishing reel as claimed in claim 2, wherein the bushing has an annular groove for receiving the clamping portion of the connecting rod therein.

4. The fishing reel as claimed in claim 1, wherein the elongated slot of the pawl is an open elongated slot.

5. The fishing reel as claimed in claim 1, wherein the elongated slot of the pawl is a closed elongated slot.

6. The fishing reel as claimed in claim 1, wherein the means for transmitting power comprises a gear and an axial rod; the gear is sleeved onto the axle; one end of the axial rod is inserted into an insertion hole of the transmission gear and the other end of the axial rod is rotatably mounted on the housing; the axial rod has a toothed portion engaging with the gear.

* * * * *